(12) United States Patent
Stockman et al.

(10) Patent No.: US 6,619,578 B2
(45) Date of Patent: Sep. 16, 2003

(54) WINDING APPARATUS AND METHOD

(75) Inventors: Michael L. Stockman, Ft. Wayne, IN (US); Michael R. Mills, Holland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,151

(22) Filed: Nov. 27, 2001

(65) Prior Publication Data

US 2003/0098379 A1 May 29, 2003

(51) Int. Cl.$^7$ ............................................... H02K 15/09
(52) U.S. Cl. ........................... 242/433; 29/596; 29/605; 29/606; 29/736
(58) Field of Search ........................... 242/433; 29/596, 29/605, 606, 732, 734, 736

(56) References Cited

U.S. PATENT DOCUMENTS

| | | | |
|---|---|---|---|
| 3,815,207 A | * 6/1974 | Habegger | 29/596 |
| 3,818,571 A |   6/1974 | Arnold et al. | 29/205 R |
| 3,831,641 A |   8/1974 | Schlaudroff et al. | 140/92.1 |
| 3,845,548 A | * 11/1974 | Arnold | 29/596 |
| 3,879,842 A |   4/1975 | McKinley et al. | 29/596 |
| 3,886,653 A | * 6/1975 | Arnold | 140/92.1 |
| 3,949,464 A |   4/1976 | Walker | 29/596 |
| 4,538,349 A | * 9/1985 | Nakamura | 29/596 |
| 4,750,258 A | * 6/1988 | Anderson | 29/596 |
| 4,955,130 A | * 9/1990 | Bricker et al. | 29/213.1 |
| 5,237,740 A | * 8/1993 | Hayashi et al. | 29/734 |
| 5,537,730 A | * 7/1996 | Pease | 29/596 |
| 5,802,706 A | * 9/1998 | Barrett | 29/596 |
| 5,829,118 A | * 11/1998 | Gates | 264/272.2 |
| 6,282,775 B1 | 9/2001 | Barrett | 29/596 |

\* cited by examiner

Primary Examiner—Emmanuel Marcelo
(74) Attorney, Agent, or Firm—Cantor Colburn LLP

(57) ABSTRACT

A method and apparatus for winding and placing windings on the magnetic core of a motor without transferring the windings prior to insertion. The method and apparatus include using a single coil winding/injection device having a plurality of gap defining elongate blades arranged in a circular array for use in winding coils and then insertion into a stator core.

28 Claims, 6 Drawing Sheets

WINDING APPARATUS AND METHOD

BACKGROUND OF THE INVENTION

The stator of a dynamoelectric machine such as an electric motor or generator typically includes a core of magnetic material having an axially extending bore for receiving a rotor. The core typically is formed from a plurality of identical laminations which are aligned and arranged in a stack held together by clips. Each lamination includes a plurality of teeth which extend radially into the bore. Slots between each of the teeth extend radially outwardly from the bore. The ends of the teeth and the open ends of the slots define the periphery of the bore.

A plurality of coils formed from insulated conductive wire are inserted into selected core slots with portions of the coils at the ends of the core forming end turn regions. The coils are interconnected to form coil groups or poles. The conductive wires which form the coils, sometimes referred to as stator windings, typically are coated with a varnish or an enamel so that a tough protective coating is formed around each wire. The coating is required so that each wire is well insulated from the other wires. Improvements to or reduction of damage to such coating facilitates improved motor performance by, for example, reducing field failures. Damage often occurs during insertion of the coils into the core slots because of misplacement.

To insert the coils into the stator core slots, it is known to form coil groups with coil forms, then transfer the coil groups to coil insertion (or injection) tooling, and then move the coil groups from the coil insertion tooling to a stator with portions thereof located in stator slots. Coil injection apparatus for inserting the coils into the stator slots is described, for example, in U.S. Pat. Nos. 3,949,464 and 6,282,775. Known tooling for such apparatus typically include a base having a plurality of radially arranged and spaced blades extending from an upper surface of the base. The blades are arranged in a circular array.

Partnering with the coil injection process, most of the electric motor industry uses the "shed" type coil winders. The principle of the "shed" winder is that it wraps wire around a tapered coilform step and then pushes this wire down the taper into the tooling as the next turn of wire is wrapped above it. Stand-alone "shed" winders will wind coils into a "transfer tool". The process of winding today uses the transfer tool to transfer the wound coils from a winding machine to the inserting machine. The operator uses the transfer tool to manually transfer the coils to the tooling for use with the injection/insertion machine.

With the advent of improved machine tool controls, the "shed" type winder has become more versatile providing the motor manufacturers with additional savings on smaller production runs. A standalone "shed" winder can be changed from one lamination to another within two (2) minutes. Stack height changes and pole configuration changes can be made automatically. This flexibility is crucial since the winding process sets the pace for the entire stator assembly line. However, misplacement of coils when transferring coil groups from transfer tooling to the insertion tooling is the single largest manufacturing defect in any stator winding operation. Misplacement of coils within insertion tooling results in incorrect rotation and operation of the motors and significant speed and torque changes.

One method to improve product quality while reducing direct labor in stator assembly is to integrate the winding and injecting operations into a common machine. Instead of winding into a transfer tool (for manual transfer of the coils to the injector tooling), these machines wind the stator coils directly into the correct slots of injection tooling. The insulated stator core is manually placed within the machine and its alignment is verified.

Customers using these machines experience very high machine utilization and tooling life. This is due to the fact that operator error is practically eliminated since the machine automatically winds the stator coils into the correct slots and the stator alignmerit is automatically verified prior to it being placed on the injection tooling. When this technology is coupled with automated set-up features, the result is a highly productive, flexible and reliable cell at the heart of the stator assembly process. This is the goal of motor manufacturers regardless of their labor costs. However, these integrated machines are expensive and in the event of a machine malfunction, or need for production of different winding designs, a winding/injecting/ automation machine limits manufacturing flexibility.

Accordingly, it would be desirable and advantageous to provide a method and apparatus for eliminating misplacement of coils for insertion in a stator during manufacturing, thus reducing the scrap attributed to defective stators. It would also be desirable and advantageous to provide a method and apparatus which is low in cost, both for manufacture and maintenance, and which eliminates a need for a human operator to transfer wound coils from the winding operation to the insertion operation during the manufacturing process.

SUMMARY OF INVENTION

The above discussed and other drawbacks and deficiencies are overcome or alleviated by a method and apparatus for winding and placing windings on the magnetic core of a motor without transferring the windings prior to insertion. The method comprising: loading a wire stripper assembly having a first wire stripper including a substantially circular circumferentially extending continuous shoulder and a second wire stripper, into a bore of coil winding/injection device in a random angular orientation relative to such device; winding turns of wire into gaps established by the device directly from a corresponding winding machine such that a clearance between the first wire stripper continuous shoulder and the bore is approximately one-half the diameter of a smallest diameter wire included in the windings; positioning a slotted magnetic core on the device with slots of the core aligned with gaps of the device; moving the stripper assembly and engaging selected portions of the wire turns with the continuous shoulder within the bore of the device and axially moving said wire turns along said device and into slots of the core by engaging the wire stripper assembly with only portions of the wire turns positioned within the bore of the device.

In an alternative embodiment, a single device for winding and injecting coils for a motor without manual transfer of the coils comprises a plurality of gap defining elongate blades arranged in a circular array, the blades configured to have the coil groups wound thereon from a winding machine such that portions of each of the coils are located in gaps between adjacent ones of the blades and segments of each of the coils extend across the interior of said circular array of blades; and a stripper assembly movable axially within the circular array of blades, the stripper assembly includes a first stripper having a disk having an outer diameter less than an inner diameter of the circular array, a first surface of the first stripper configured to contact at least one segment of at least one coil which extends across an interior of the circular array of blades and to move at least the one coil axially along the blades without contacting the portions of the one coil in the gaps between the blades.

BRIEF DESCRIPTION OF DRAWINGS

Referring now to the drawings wherein like elements are numbered alike in the several Figures.

DETAILED DESCRIPTION

Figure 1:
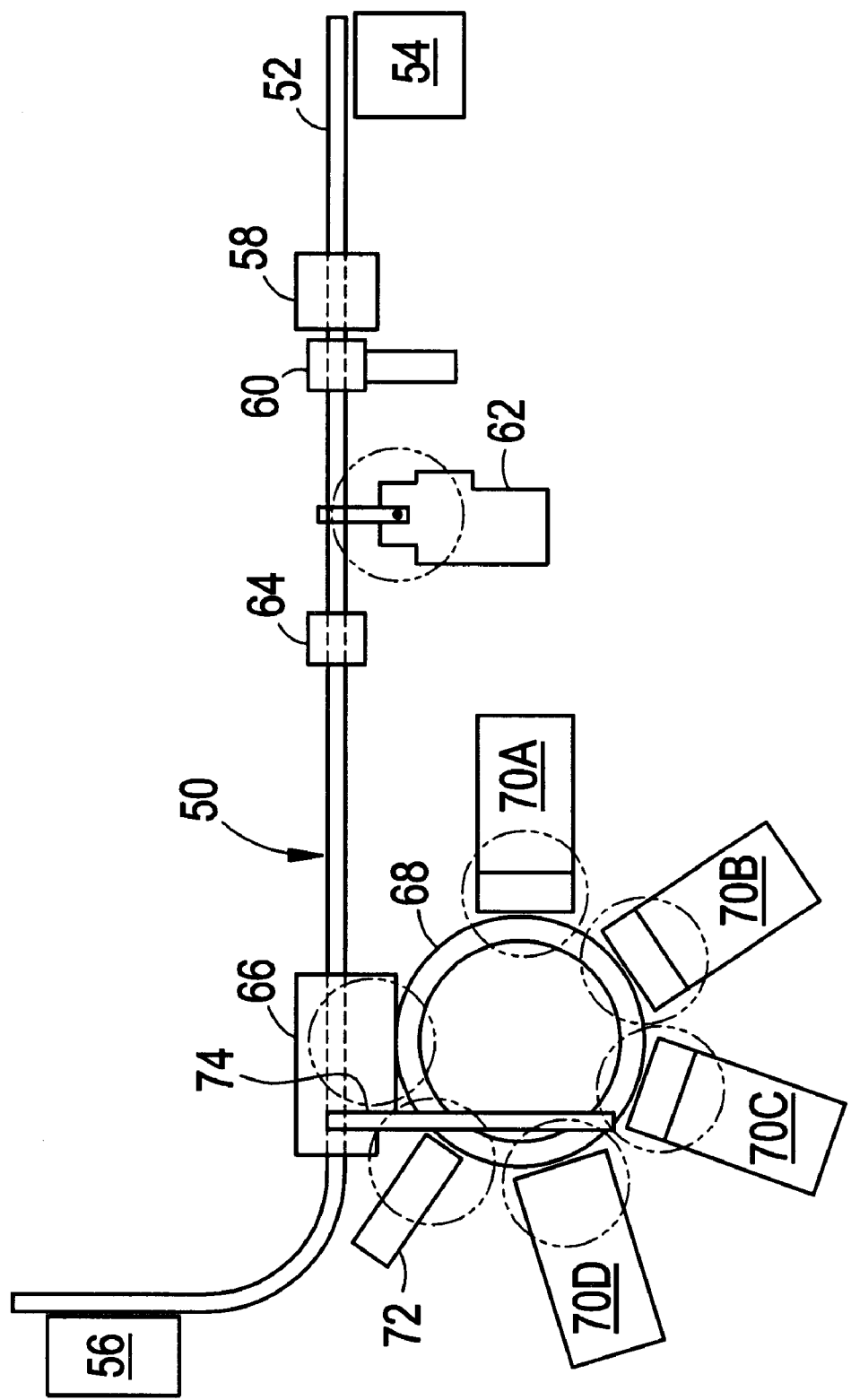
FIG. 1 is a block diagram depiction of a conventional automated coil injection system for injecting stator coils into stator cores for multi-speed motors.

FIG. 1 illustrates one embodiment of a conventional coil injection system in block diagram form. System 50 includes a first conveyor 52 which extends between a first pallet 54 for stator cores (not shown) and a second pallet 56 for storing "loaded" or "wound" stator cores subsequent to the coil injection. The laminations forming the core are compressed at a core compression station 58 to ensure that there are no gaps between laminations forming such cores. A core check and reject station 60 is provided to ensure that the slots and teeth of each core are properly aligned. The core insulation is loaded into the stator slots at a slot insulation injection station 62. The insulation is then checked at a slot insulation check and reject station 64. The coils are injected into the stator core at a coil injection station 66. Once the coil groups are injected into the core, the "loaded" stator core then travels along conveyor 52 to second pallet 56, where the "loaded" stator cores are removed from conveyor 52 onto second pallet 56.

A closed loop conveyor 68 is provided for supplying injection devices to station 66. Conveyor 68 operates to move injection devices in a generally clockwise direction. Winding stations 70A–D are located at spaced locations along closed loop conveyor 68. A wedge maker 72 also is provided along closed loop conveyor 68, just prior to injection station 66. Winding stations 70A–D and wedge maker 72 are well known in the art and are commercially available, for example, from Advance Machine and Tool Corp., Fort Wayne, Ind. and Statomat Special Machines Inc., Charlotte, N.C.

A stripper guide chute 74 extends from injection station 66 to a location between winding stations 70C and 70D. Chute 74 has a substantially u-shape cross sectional shape with the open end of shoot 74 fading upward Automated "pick and place" machines(not shown), which are well known, are located at both ends of stripper guide shoot 72.

With respect to the process for loading injection device (not shown) with the coil groups, and with initial reference to injection station 66, one of several empty or "unloaded" transfer tools travel on closed loop conveyor 68 to first coil winding station 70A. A first coil group is formed at winding station 70A and loaded onto predetermined blades of the transfer tooling. A second transfer tool or winding cup then travels on conveyor 68 to winding stations 70B or 70C. A second coil group is formed at stations 70B or 70C and then travels on conveyor 68 for transfer to predetermined blades of the coil injection device, but axially above the first coil group. Both stations 70B and 70C are used to form second coil groups in order to reduce the overall time required to load a series of transfer tools or winding cups.

Another transfer tool or winding cup then proceeds, on conveyor 68, to winding station 70D where another coil group is loaded. This transfer tool then moves, on conveyor 68, to wedge maker 72 where slot closing insulation wedges are loaded. The transfer tool then travels on conveyor 68 to injection station 66.

At injection station 66, each of the transfer tools or winding cups are manually transferred onto an injection device by flipping each of the transfer tools while aligning the coil group associated with a particular transfer tool with blades of the injection device. After the second coil group has been loaded onto the blades, a stripper is loaded onto the tooling. More specifically, a conventional pick and place machine (not shown) picks the stripper 50 from stripper guide chute 74 and places the stripper into the interior of the blades. The injection device is aligned with a stator core, and the first, second and third coil groups are injected into the stator core in a manner known in the art.

Figure 2:
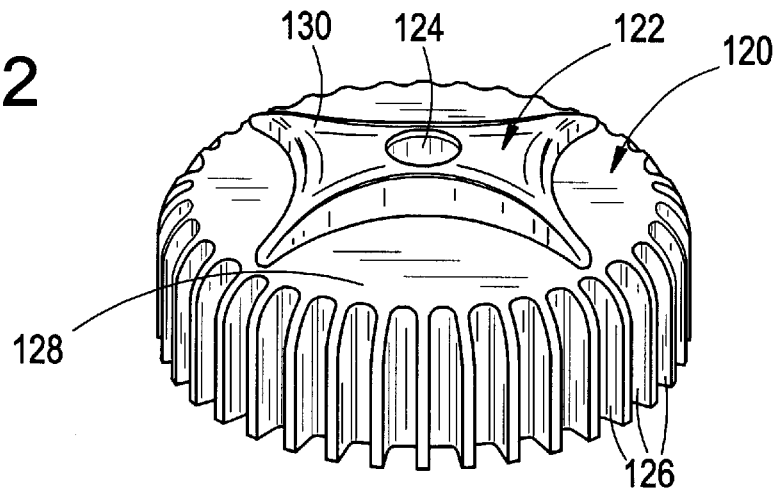
FIGS. 2 and 3 are perspective and plan views, respectively, of a conventional stripper and a conventional four leg star.

FIG. 2 is a perspective view of a conventional stripper 120 used in a one pass method for injecting two 4-pole and 1 six pole winding groups for a multiple speed motor secured to tooling not shown by a bolt 124. Stripper 120 has a four leg star 122 secured thereto by bolt 124. Stripper 120 has a generally circular shape with fins 126 formed at its outer periphery. A first, or operative, surface 128 of stripper 120 and a first, or operative, surface 130 of star 122 contact stator windings placed on the injection tool blades (not shown) during an injection process. Fins 126 extend into the gaps between adjacent blades of the circular array of blades of the not shown injection device.

Figure 3:
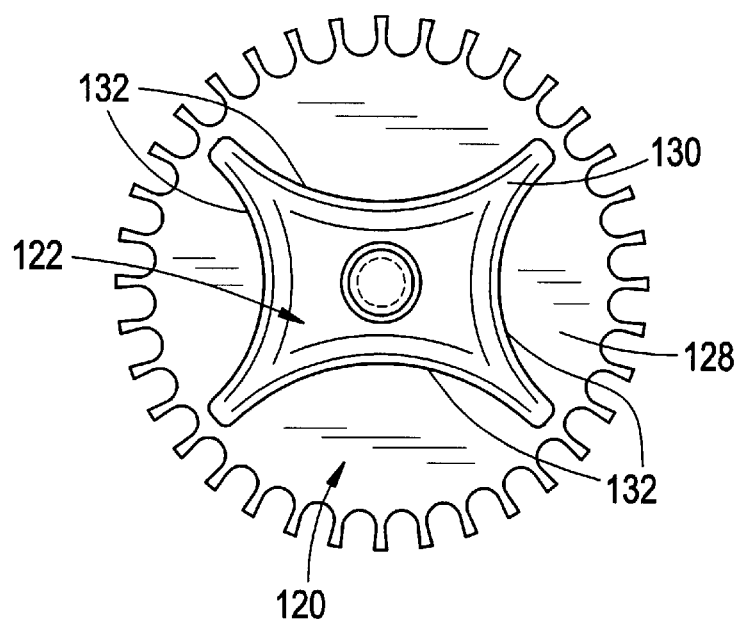

As best shown in FIG. 3 concave portions 132 of star 122 define regions of surface 128 of stripper 120 which make direct contact with a first coil group during the injection process First surface 130 of star 122 contacts portions of a second coil group during the injection process.

Figure 5:
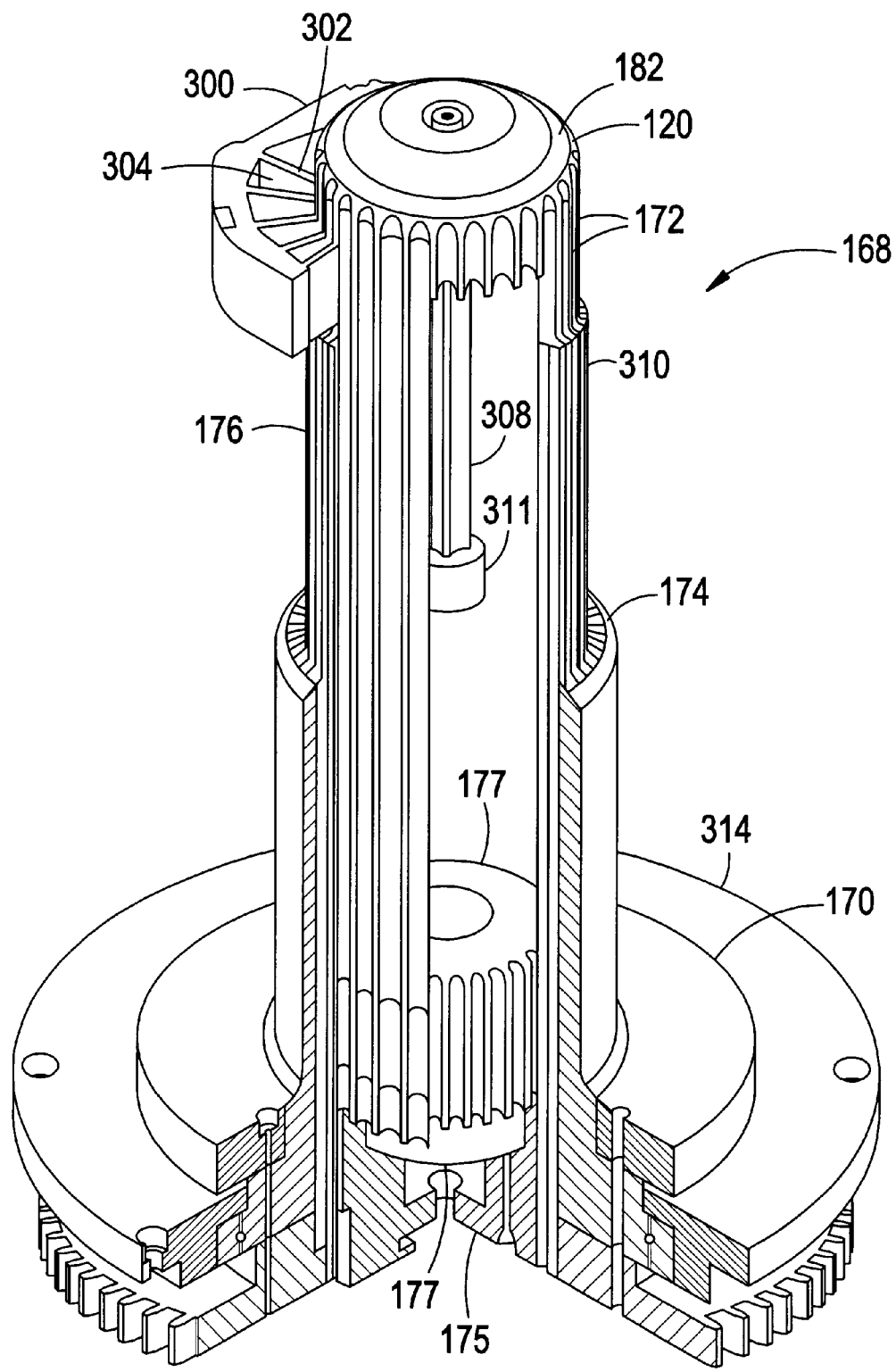
FIG. 5 is a perspective view of one embodiment of a transfer tool pack for winding and inserting coils in a preferred form.

When stripper 120 and star 122 are used to inject a four pole main winding coil group and a four pole start winding coil group into a stator core, stripper 120 and star 122 initially are located in a retracted position in the lower part of the circular array of blades of injection tooling as suggested by FIG. 5. The coil groups are produced with winding equipment and placed on blades of coil insertion equipment such that the windings of the coil groups are located on blades at a location axially above stripper 120 and star 122 (as suggested in FIGS. 6 and 7). Typically the lowermost coil group is the four pole start coil group, the middle coil group is a six pole group main/start coil group, and the uppermost coil group is the four pole main coil group. Portions of each coil extend through gaps between the blades and segments of each coil extend or span across an interior region of the circular array of blades that form the coil injection tooling.

A stator core (see FIG. 5) is then aligned with and placed on the injection tooling so that each blade registers with a stator tooth and gaps between adjacent blades register with stator slots between adjacent stator teeth. To inject the coils, a push rod moves stripper 120 and star 122 in a direction to push the side turns of the coil groups into the stator slots.

Fins 126 of stripper 120 are provided to contact the side turn portions of the coils of the coil groups that lie in the gaps between adjacent blades. Also, the regions of stripper surface 128 defined by a concave portions 132 of star 122 contact the segments of the coils of the start coil group which lie within the interior of the circular array of blades. First surface 130 of star 122 contacts the segments of the coils of the main coil group which lie in the interior of the circular array of blades. When stripper 120 and star 122 contact the coils as described above, and as the stripper and star continue to move, the stripper and star force the coils to move along the blade gaps toward the stator core.

As stripper 120 begins to move through the stator bore of the stator core, fins 126 of stripper 120 continue to contact coil portions in the blade gaps and force such coil portions into stator slots. When the coil portions are fully injected into the stator core, stripper 120 and star 122 are retracted and the "loaded" or "wound" stator core is removed from the tooling.

Attempts have been made to use stripper 120 and star 122 for injecting, in one-pass, three or more coil groups into a stator core for a multiple speed motor. The forces required to inject such coil groups into the stator slots, however, are extremely high and result in unacceptable damage to the windings. As a result, a two-pass injection process, as described above, typically is utilized for injection of more than two coil groups. To overcome many of the disadvantages and short comings used in the past, particularly with respect to one-pass injection of more than two coil groups into the stator slots of a stator core, stripper 150 shown in FIG. 4 is used.

Figure 4:
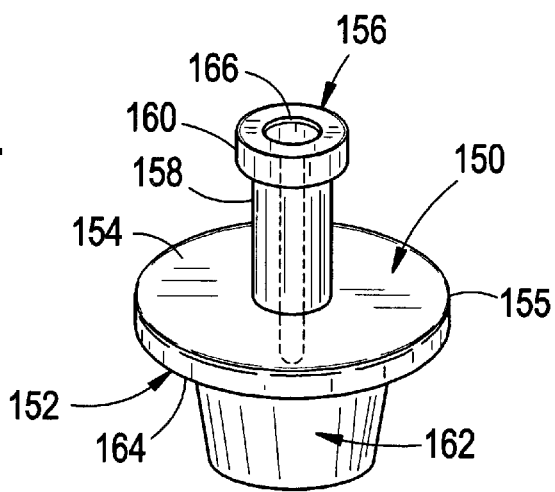
FIG. 4 is a perspective view of an exemplary embodiment of a stripper useful in carrying out coil winding and injection in a preferred form.

Referring to FIG. 4, stripper 150 includes an injection disk 152 having a first operative surface 154 that defines a continuous curved injection shoulder 155 around its outer perimeter. A handle 156 extends from surface 154 and includes a post 158 and a grip member 160. A weight member 162 extends from a second surface 164 of disk 152. Weight member 162 may be in many geometric shapes but is shown with a generally frusto-conical shape.

Disk 152 and handle 156 may be constructed of any suitable material such as, for example, plastic, brass, wood, metal, etc. Disk 152 preferably, although perhaps not necessarily, is formed of a material which is softer than the insulation of the magnet wire to be injected by disk 152. In the preferred embodiment, disk 152 and handle 156 are made of nylon and machined using a lathe. Disk 152 and handle 156 could, alternatively be formed using a molding process. Weight member 162 may have many other shapes and may be constructed of many materials. In the preferred embodiment, weight member 162 is formed from cold rolled steel. Handle 156 and weight member 162 are attached to disk 152 by a bolt 166 which extends through aligned openings in handle 156, disk 152, and weight member 162. Alternatively, an adhesive could is used to form such attachment.

In FIG. 5, a coil winding/injection device or tool pack 168, with some parts cut away, is illustrated interfacing a stator core during the coil injection process. Device 168 includes a lower housing member 170. Coil injection tooling in the form of elongated blades 172 extend from the upper part of a wedge guide housing 174 that extends from housing 170. Blades 172 are formed in a circular array depending from a blade holder 175. Blade holder includes a bore 177 for providing access to actuate a push rod 308 acting on stripper 182 via coupling 311. Gaps 176 are defined between adjacent blades 172. Disposed within each gap 176 below stator 300 is a wedge guide 310 aligned with stator slots 304 for insertion of a closing insulation wedges (not shown) for load into the opening of slots 304 during the insertion process. Wedges are formed and placed into wedge holder magazines prior to inserting windings into the core. These wedges prevent the inserted coils from protruding outside the tooth geometry and retain the copper wire with the bore. A lower portion of the wedge guides are housed in wedge guide housing 174 that extends from wedge guide housing locator 314.

Figure 6:
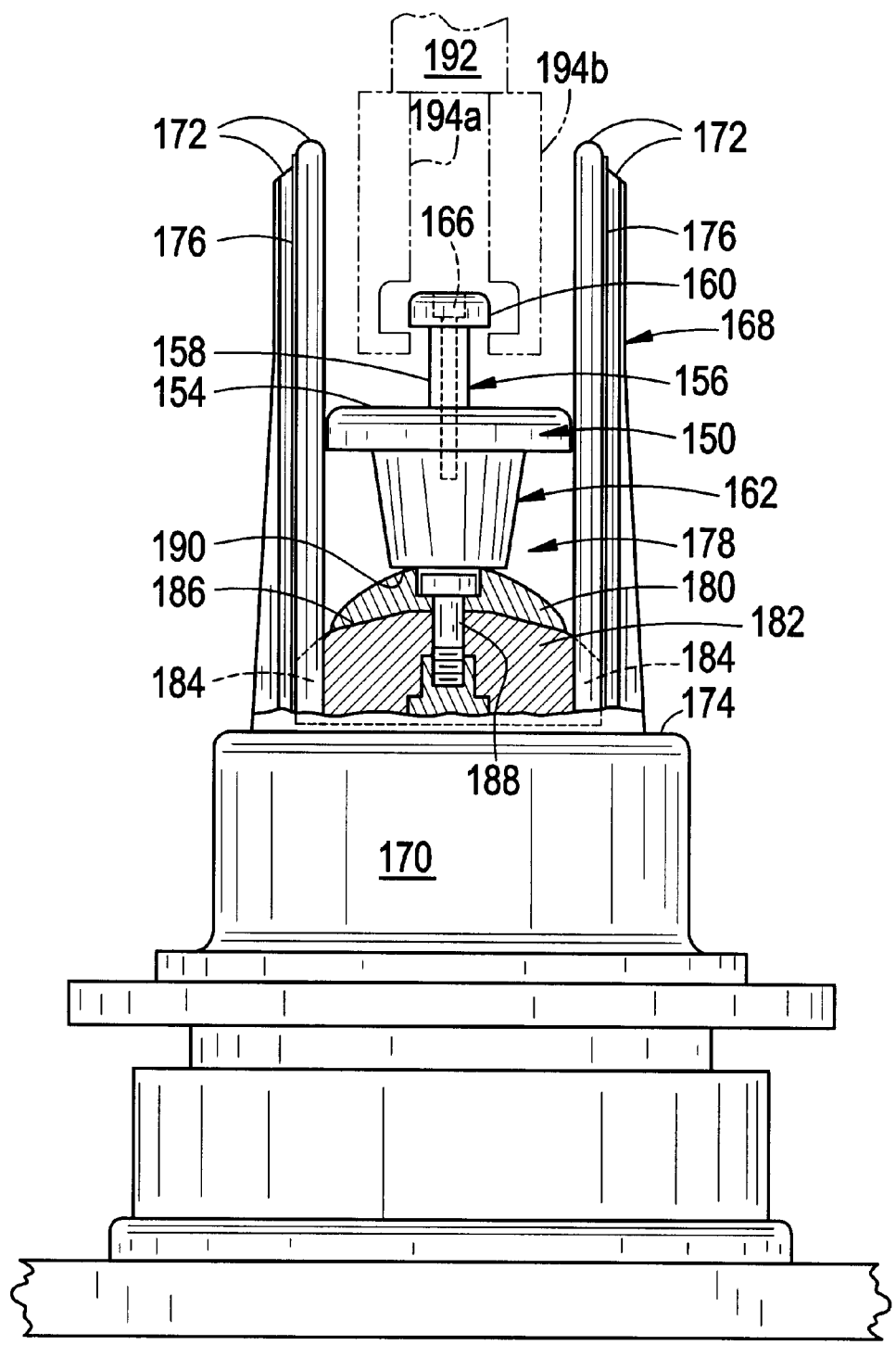
FIG. 6 is an elevation, with parts removed and broken away, of coil injection apparatus in FIG. 5.

Referring to FIG. 6, another view of tool pack 168 shown in FIG. 5 is illustrated with stripper 150 employed therein. In FIG. 6, some blades 172 are cut away in order to better illustrate a stripper assembly 178. Also, no coil groups are shown in FIG. 6. Stripper assembly 178 includes first stripper 150. In an exemplary embodiment, the clearance or tolerance between the outer periphery of disk 154 of first stripper 150 and the inner periphery of the circular array of blades 172 preferable is no greater than approximately one-half the diameter of the smallest diameter wire which will be injected by first stripper 150.

Stripper assembly 178 includes a four leg star 180 and a second stripper 182. Four leg star 180 and second stripper 182 are identical to stripper 120 illustrated in FIGS. 2 and 3. It will be seen that second stripper 182 includes fins 184 which extend into gaps 176 between adjacent blades 172. Second stripper 182 also includes a first operative surface 186. Star 180 and stripper 182 are secured to each other by bolt 188. A second lower surface 190 of weight member 162 rests on star 180. A spacer or star (not shown) could be positioned between star 180 and weight member 162.

A gripper 192, shown in phantom, forms part of an automated pick and place machine. (not shown). Gripper 192 includes first and second arms 194A and 194B, respectively. Arms 194A and 194B are configured to grip the grip-member 160 of handle 156, as hereinafter described in more detail.

Figure 7:
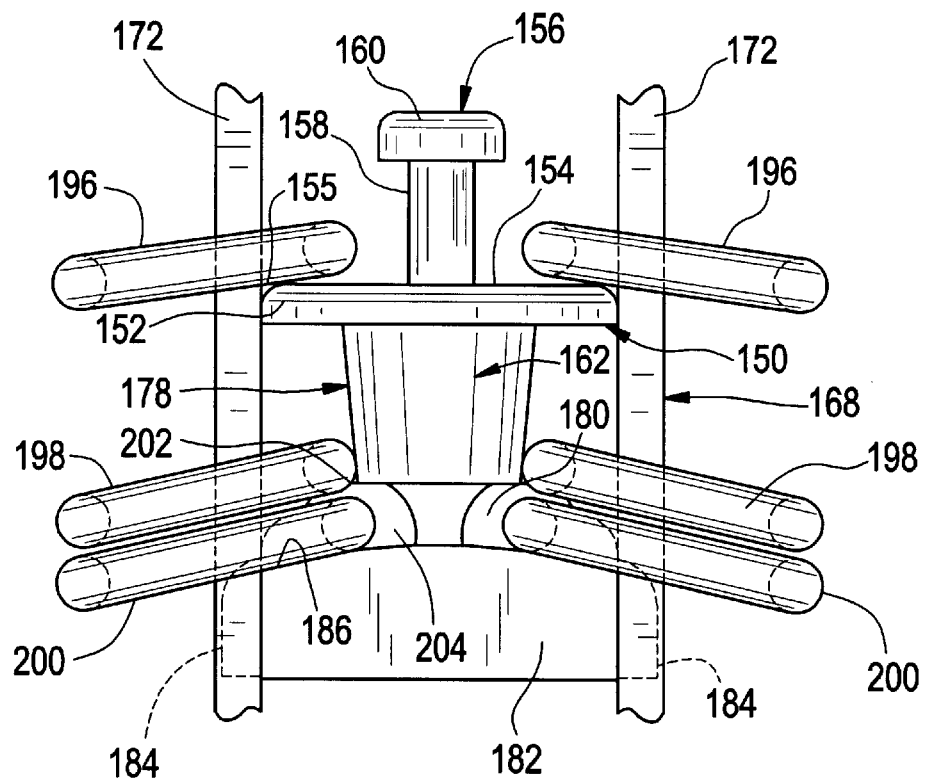
FIG. 7, is a schematic representation of parts of apparatus and motor windings and includes a retracted stripper with a four leg star, and three coil groups.

FIG. 7 is useful in explaining the process of injecting coil groups with coil assembly 178 and device 168, and shows first, second and third coil groups 196, 198, and 200 loaded on blades 172 of device 168. First coil group 196 is positioned adjacent first surface 154 of first stripper 150. Second coil group 198 is positioned adjacent a first surface 202 of four leg star 180. Third coil group 200 is positioned adjacent the regions of first surface 186 of second stripper 182 defined by concave portions 204 of star 180. The first coil group 196, may have four main winding coils, the second coil group 198 may have six main winding coils, and the third coil group 200 may have four start, or auxiliary, winding coils.

It will be understood by those skilled in the art and viewing FIG. 7, that the third coil group 200 is first loaded onto blades 172 directly from a winding machine (not shown) so that segments of the coils of third group 200 extend or span across the interior of the circular array of blades 172. Such segments also are either nested into or aligned for contact with upper, or operative, surface 186 of second stripper 182.

Second coil group 198 is then loaded onto blades 172 directly onto tool pack 168 from a second winding machine (not shown). The coils of second group 198 are angularly and axially displaced from the coils of third group 200. Typically, the blade gaps occupied by third coil group 200 are not occupied by the second (or first) coil group 198 (or 196) and vice versa. Segments of the coils of second group 198 extend or span across the interior of the circular array of blades 172. Such segments also are aligned for contact with upper surface 202 of star 180.

After third coil group 200 and second coil group 198 are loaded onto the circular array of blades 172 as described above, first stripper 150 is lowered into the circular array of blades 172 so that the vertical axis of nylon injection disk 152 is substantially coaxial with the vertical axis of the circular array of blades 172. Weight member 162 of first stripper 150 rests on upper surface 202 of four leg star 180. Injection disk 152 of first stripper 150 is axially above the coils of coil groups 198 and 200. First coil group 196 is then loaded onto the free ends of blades 172 depending from tool pack 168 palletized at a third winding machine not shown.

In order to inject coil groups 196, 198 and 200 into a stator core 300 referring to FIG. 5, stator core 300 is aligned with the injection device 168 so that each blade 172 registers with a stator tooth 302 and the gaps 176 register with stator slots 304. A push rod 308 extends through housing member 170 and couples to second stripper 182, and forces stripper assembly 178 in a direction to place coil group 196 on the stator core 300 (See FIGS. 7 and 8). As first stripper 150 moves axially within the blades 172, shoulder 155 and surface 154 of disk 152 contacts the segments of first coil group 196 which extend and span across the interior of the circular array of blades 172. Injection disk 150 forces first coil group 196 to move along blades 172 towards the stator core.

Referring again to FIG. 8, injection disk 152 does not physically contact those portions of the coils of first coil group 196 which lie in the gaps 176 of adjacent blades 172. As injection disk 152 moves through the rotor bore of the stator core, the coil portions of first coil group 196 in gaps 176 are forced into the respective aligned stator slots. Injection disk 152 of first stripper 150 is pushed completely through the stator bore so that first coil group 196 is fully injected into the stator slots.

As first stripper 150 moves along the array of blades 172 as described above, four leg star 180 and second stripper 182 also move along the blades. Four leg star 180 moves the segments of second coil group 198 and upper surface 186 of second stripper 182 moves the segments of third coil group 200. Fins 184 of second stripper 182 contact and move the portions of second and third coil groups 198 and 200 which lie in the gaps 176. Second stripper 182 and star 180 cause second and third coil groups 198 and 200 to move axially along blades 172 toward the stator core. Second and third coil groups 198 and 200 are injected into the stator slots as star 180 and second stripper 182 move through the rotor bore.

As a result of the injection operation described above, first main coil group 196 is positioned on the stator core, within the stator slots at a radial location furthest away from the rotor bore, i.e., at the stator slot bottom or closed end. Third coil group 200 will be positioned within the stator slots at a location radially closest to, or adjacent to, the stator bore. Second coil group 198 is positioned within the stator slots at an intermediate location between first main coil group 196 and third coil group 200.

The one-pass coil group injection process described above may be performed using significantly lower forces at least as compared to the forces required with a particular known injection stripper assembly. Because of such lower forces, the number and extent of pressure marks formed on the coil wires because of fins 184 may be significantly reduced. Also, since injection disk 152 does not have any fins, not only are pressure marks virtually eliminated, but the possibility of lock-up between injection disk 152 and the coils of first main coil group 196 injected by such disk 152 is believed to be significantly reduced, if not eliminated entirely. More importantly, by winding each coil group directly onto the coil injection tooling 168 and eliminating the use of a transfer tool, the risk of misplacement of the coil forms is eliminated. In addition, the costs usually associated in winding and injection of coils using total automation is alleviated by palletizing the transfer tool pack for use with each winding machine and inserter, while eliminating hand transfer of the coil forms prior to insertion.

A somewhat surprising and unexpected advantage also results because of the significantly lower forces that are used. The advantage is that the third coil group 200 can be the start winding coil group since the threat to wire damage caused by excessive injection forces has been overcome. Particularly, as described above, third coil group 200 is positioned within the stator slots at a radial location closest to, or adjacent to, the stator bore. Positioning the start winding coils adjacent the rotor bore provides certain operational advantages as discussed above. Since only low forces are required to inject such coil groups, the wire and insulation forming the start winding coils can withstand the direct forces exerted during single pass injection by second stripper 182, including second stripper fins 184, without being significantly damaged.

Further, when injection disk 152 is constructed of nylon, disk 152 is relatively inexpensive to manufacture as compared to the manufacturing cost associated with known brass strippers. Also, maintenance costs for such injection disk 152 are reduced, and a nylon injection disk seems to be unexpectedly longer lived and more rugged as compared to brass stripper 120 having fins 126.

Star 180, of course, does not necessarily have to be used in connection with stripper assembly 178. For example, six leg star could be used in place of four leg star 80. Moreover, as shown in FIG. 8, no star could be used.

Figure 8:
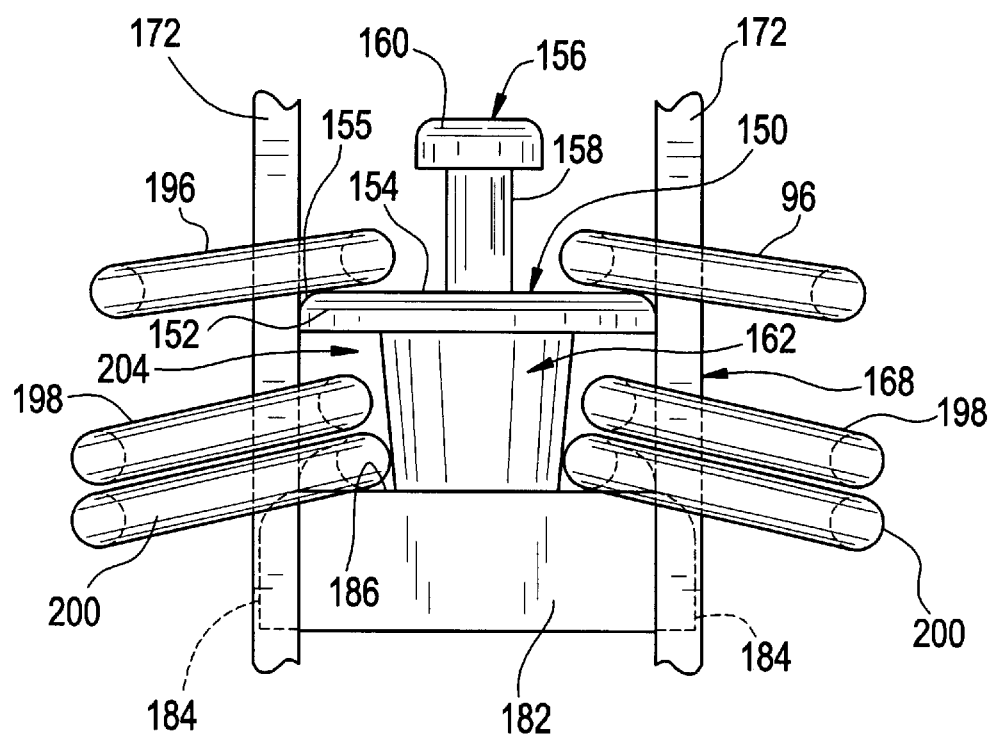
FIG. 8 is a view similar to FIG. 7 but of a stripper wherein the star has been omitted.

FIG. 8 illustrates a coil injection assembly 204 which includes first stripper 150 and second stripper 182. As compared to assembly 178 illustrated in FIG. 7, in assembly 204, four leg star 180 has been removed. A spacer (not shown) could be positioned between weight member 162 and stripper 182. With assembly 204, second coil group 198 rests on third coil group 200 rather than being separated from third coil group 200 by star 180. This configuration can be used in some injection processes where it is acceptable to have third coil group 200 assert some additional forces against second coil group 198 during the coil injection process.

With the various configurations discussed above, since first stripper 150 can be placed at any angular orientation within the bore defined by the circular array of blades 172, an automated robotic arm can be used to place first stripper 150 within the bore. As explained above, and with known strippers having fins, such automated placement is not believed to have been possible heretofore. First stripper 150, however, does not have fins and does not have to be oriented within the circular array of blades at any particular angular orientation. Use of first stripper 150, therefore, enables full automation of a coil injection process utilizing double strippers, even when injecting more than two coils into a stator core. While use of transfer tool pack 168 with each winding machine and inserter by transport on a pallet, eliminates the hand transfer of coils in the past, thus reducing the costly misplacement of coils on the inserter tooling, while avoiding costs of total automation.

Figure 9:
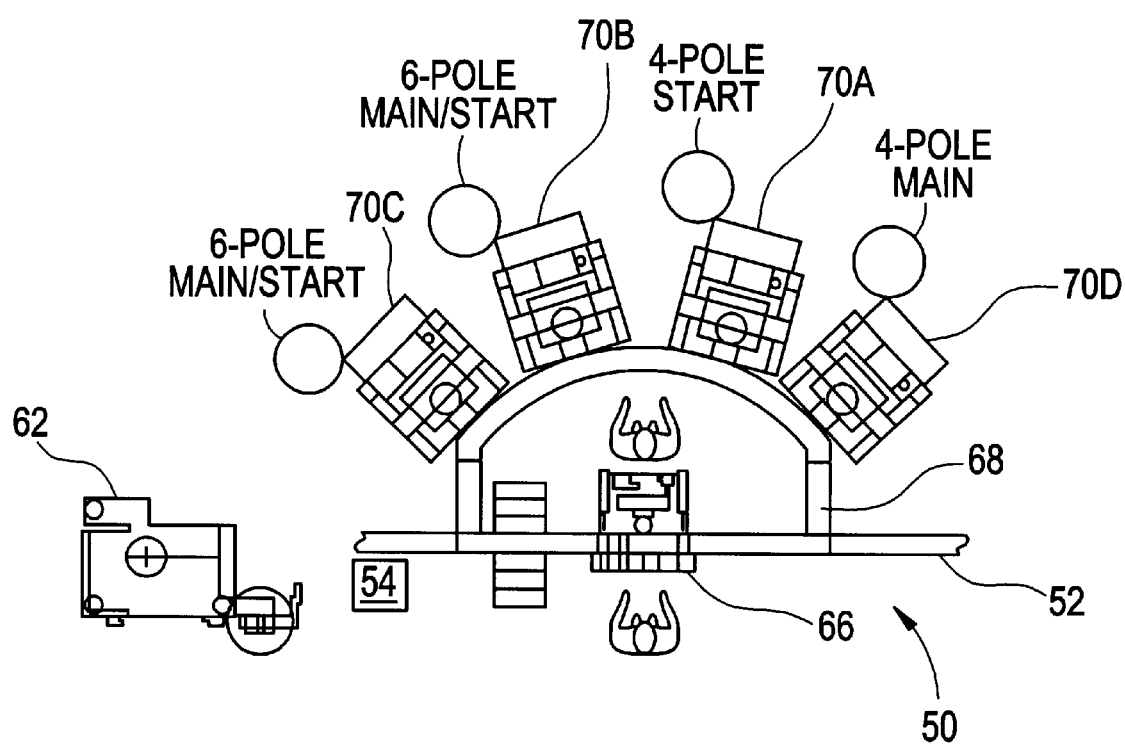
FIG. 9 is a block diagram depiction of an exemplary coil winding and injection system for injecting stator coils into stator cores for multi-speed motors.

FIG. 9 illustrates an exemplary embodiment of a coil injection system in block diagram form for use with a palletized inserter tooling or tool pack 168. System 50 includes first conveyor 52 for transporting first pallet 54 having a tool pack 168 between slot insulation injection station 62, winding machines 70A–D, and coil injection station 66. Once the coil groups are injected into the core, the "loaded" stator core then travels along conveyor 52 and removed from conveyor 52 onto second pallet (not shown) so that tool pack 168 on first pallet 54 can be used for winding and injecting another stator core.

Closed loop conveyor 68 is provided for supplying tool pack 168 on first pallet 54 to station 66 after coil winding is completed on tool pack 168. Conveyor 68 is in operable contact with conveyor 52 to operably move tool pack 168 on first pallet 54 to conveyor 68 for transport to any of the winding machines located around conveyor 68. Winding stations 70A–D are located at spaced locations along closed loop conveyor 68. Winding stations 70A–D are well known in the art and are commercially available, for example, from Advance Machine and Tool Corp., Fort Wayne, Ind. and Statomat Special Machines Inc., Charlotte, N.C.

With respect to the process for loading injection device or tool pack 168 with the coil groups, and with initial reference to injection station 66, an empty or "unloaded" tool pack 68 travels on closed loop conveyor 68 to first coil winding station 70A.

Second stripper 180 is already contained within the lower section of the circular array of blades 172. Stripper 150 is manually installed between Winders 70Band 70A. Each machine will be searching for this device if a specific winding type is selected in which the programmer selects the detect device option within the machines software abilities. Third coil group 200 is formed at winding station 70A and wound directly onto blades 172 of the injection tool pack 168. Tool pack 68 then travels on conveyor 68 to winding stations 70B or 70C. The second coil groups 198 are formed at stations 170B or 170C and wound directly onto blades 172 of the tool pack 168, but axially above second stripper 182. Both stations 70B and 70C are used to form second coil groups in order to reduce the overall time required to load a series of tool packs 68.

After the second coil group 198 has been wound onto the blades 172, stripper 150 is loaded into the tooling. More specifically, an operator will place the first stripper 150 from stripper guide chute (not shown) and place the stripper 150 into the interior of the blades 172, on top of second stripper 182, as hereinbefore described. Weight member 162, helps assure that stripper 150 will depend vertically from the pick and place gripper and, in effect, "fall" into the tooling. The length of weight number 162 is at least equal to the column height of second and third coil groups 198 and 200 and 198 so that injection disk 152 is axially above such coil groups.

Tool pack 168 then proceeds, on conveyor 68, to winding station 70D where first coil group 196 is loaded onto blades 172 and axially above coil injection disk 152 of first stripper 150. Tool pack 168 then moves, on conveyor 68, to injection station 66.

At injection station 66, injection tool pack 168 is aligned with a stator core, and coil groups 196, 198 and 200 are injected into the stator core in the manner as hereinbefore described. Once the coils are fully injected into the stator core, the handle of first stripper 150 protrudes above the top of the stator core, whence a pick and place machine that is attached to the coil insertion machine(not shown) grips the handle of first stripper 150 and removes first stripper 150 from the stator and the injection tool pack 168. First stripper 150 is then held above the pallet. This pallet will not release from the insertion machine until the stripper 150 is in the holding device on the pallet. An operator must release the stripper form the retention device and place this into a holding device. This device will not release the pallet until the stripper is located on the tooling pack.

The method and apparatus disclosed herein eliminate the handling of coils that are wound, as well as misplacement in the inserting tools. The insertion tooling is palletized land transported to the individual winding machines for directly winding on to the insertion tooling, thus eliminating the step of transferring wound coils from a transfer magazine to the insertion tooling. Eliminating this transfer after winding, limits misplacement of coils onto insertion tooling and allows elimination of varnish post insertion. By limiting the insertion forces required to place the coils into the stator core will eliminate the stress fatigue and possible cracking of the enamel coating on the magnet wire and reduce or eliminate the need to varnish overcoat after the insertion of the coils.

In addition, by transporting the insertion tooling to individual winding machines the cost of automation is reduced and provides greater flexibility from a manufacturing standpoint. More specifically, the above described open loop system provides greater flexibility in the event of a winding machine malfunction and in production of different winding designs.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for winding a plurality of coil groups on a single winding/injection device and injecting, from the single winding/injection device, the plurality of coil groups into the core of a dynamoelectric machine, each coil group having one or more coils, the core having a central bore and a plurality of teeth spaced around the bore with a slot between adjacent teeth extending radially outwardly from the bore, the winding/injection device comprising a plurality of gaps defining elongate blades arranged in a circular array, the blades configured to have the coil groups placed thereon such that portions of each of the coils are received in respective gaps between the blades and segments of each of the coils extend across the interior of the circular array of the blades, the device further comprising a stripper assembly movable axially within the circular array of the blades, the stripper assembly comprising a first stripper, the first stripper comprising a substantially circular disk, a first surface of the first stripper configured to contact at least one segment of at least one coil which extends across an interior of the circular array of said blades, the stripper assembly further comprising a second stripper, the second stripper including a first upper surface and plurality of radially spaced fins, each of the fins configured for extending into one of the gaps between adjacent blades, the method comprising:

winding a first coil group of the plurality of coil groups on the blades of the device from a first winding machine; a portion of first coil group wound over the first upper surface of the second stripper;

inserting the first stripper within a bore defined by the blades of the insertion tool pack, the first stripper comprising a substantially circular disk, a first surface of the first stripper configured to contact at least one segment of at least one coil which extends across an interior of the circular array of blades; winding a second coil group of the plurality of coil groups on the blades of the device from a second winding machine;

aligning the stator core over the blades so that stator core slots align with the plurality of gaps and said bore is coaxially aligned with a stator core bore; and moving the stripper assembly axially within the circular array of the blades so that the first stripper moves the at least one coil axially along the blades without contacting the portions of the one coil in the gaps between the blades, the first stripper disk having a substantially circular outer periphery defining an outer diameter less than an inner diameter of the circular array of the blades, the substantially circular outer periphery of the first stripper disk in close proximity to the circular array of blades.

2. The method in claim 1 wherein further comprising:
   aligning each of the blades to register with a respective stator tooth and aligning each of the gaps to register with a respective stator slot.

3. The method in claim 1 wherein said inserting the first stripper comprises inserting the first stripper such that a clearance between the first stripper outer periphery and the circular array of blades is approximately one-half the diameter of a smallest diameter wire included in each coil.

4. The method in claim 3 wherein after the disk of the first stripper is moved through the bore of the stator core, said method further comprises removing the first stripper from within and in alignment with the circular array of blades.

5. A method of winding and placing windings on the magnetic core of a motor without transferring the windings prior to insertion, the method comprising:

loading a wire stripper assembly having a first wire stripper including a substantially circular circumferentially extending continuous shoulder and a second wire stripper, into a bore of coil winding/injection device in a random angular orientation relative to such device;

winding turns of wire into gaps established by the device directly from a corresponding winding machine such that a clearance between said first wire stripper continuous shoulder and said bore is approximately one-half the diameter of a smallest diameter wire included in the windings;

positioning a slotted magnetic core on the device with slots of the core aligned with gaps of the device;
   moving said stripper assembly and engaging selected portions of said wire turns with said continuous shoulder within said bore of the device and axially moving said wire turns along said device and into slots of the core by engaging said wire stripper assembly with only portions of the wire turns positioned within said bore of said device.

6. A method of winding and placing windings on the magnetic core of a motor, the method comprising:

inserting a second wire stripper of a wire stripper assembly into a bore of a coil winding/injection device, said second wire stripper having a plurality of radially spaced fins;

winding at least a first winding of a plurality of windings from a winding machine onto said coil winding/injection device;

inserting a first wire stripper of said wire stripper assembly into said bore of said coil winding/injection device in a random angular orientation relative to such device, said first wire stripper having a substantially-circular circumferentially extending continuous shoulder, said first wire stripper continuous shoulder sized such that a clearance between said first stripper shoulder and the bore is approximately one-half the diameter of a smallest diameter wire included in the windings;

winding another winding of said plurality of windings from a winding machine onto said coil winding/injection device; and moving said stripper assembly and engaging portions of wire turns of said plurality of windings with said stripper assembly within the bore of said winding/injection device and moving said wire turns along said device and into slots of the core.

7. The method in claim 6 wherein a weight member extends from said first wire stripper, said method further comprising:

winding turns of wire into gaps established by said winding/injection tooling directly from a winding machine; and positioning a slotted magnetic core on said winding/injection device with slots of the core aligned with gaps of said device.

8. The method in claim 7 wherein said moving said stripper assembly further comprises:

engaging selected portions of said wire turns with said continuous shoulder within said bore of said winding/injection device.

9. The method in claim 8 wherein said moving said stripper assembly further comprises:

engaging selected portions of said wire turns with said second stripper assembly.

10. The method in claim 8 further comprising:

axially moving said wire turns along said winding/injection device into said slots of the core by engaging said wire stripper assembly with only portions of said wire turns positioned within said bore of said winding/injection device.

11. A winding/injecting device for winding and injecting a plurality of coil groups into the magnetic core of a dynamoelectric machine without transferring any of the plurality of coil groups to insertion tooling, each coil group having one or more coils, the stator having a central bore and a plurality of teeth spaced around the bore with a slot between adjacent teeth extending radially outwardly from the bore, said winding/injecting device comprising:

a plurality of gap defining elongate blades arranged in a circular array, said blades configured to have the coil groups wound thereon from a winding machine such that portions of each of the coils are located in gaps between adjacent ones of the blades and segments of each of the coils extend across the interior of said circular array of blades; and a stripper assembly movable axially within said circular array of blades, said stripper assembly comprising a first stripper, said first stripper comprising a disk having an outer diameter less than an inner diameter of said circular array, a first surface of said first stripper configured to contact at least one segment of at least one coil which extends across an interior of said circular array of blades and to move at least the one coil axially along said blades without contacting the portions of the one coil in the gaps between said blades.

12. The device in claim 11 wherein said first stripper further comprises a weight member, a first surface of said weight member being substantially adjacent a second surface of said disk, said second surface of said disk being opposite said first surface of said disk.

13. The device in claim 12 wherein said first and second surfaces of said disk of said first stripper are substantially flat.

14. The device in claim 11 wherein said first stripper further comprises a grip member extending from said first surface of said first stripper.

15. The device in claim 14 wherein said grip member of said first stripper comprises a handle configured to be gripped by a gripper of an automated pick and place machine.

16. The device in claim 11 wherein said disk of said first stripper is formed from nylon.

17. The device in claim 11 wherein an outer periphery of said disk and an inner periphery of said circular array of blades are separated by less than approximately one-half a diameter of a largest diameter wire forming the coils.

18. The device in claim 11 wherein said stripper assembly further comprises a second stripper, said second stripper having a generally circular cross-sectional shape, said second stripper comprising a plurality of radially spaced fins at an outer circumference of said second stripper, each of said fins extending into one of the gaps between adjacent blades.

19. The device in claim 18 wherein said second stripper includes a frusto-conical shaped surface configured to contact a segment of at least one coil which extends across the interior of said circular array of blades, and to move at least the one coil axially along said blades, said fins of said second stripper contacting portions of at least the one coil in the gaps between said blades.

20. The device in claim 18 wherein said second stripper is formed from brass.

21. The device in claim 18 wherein said second stripper comprises a first surface configured to contact a segment of at least one coil which extends across the interior of said circular array of blades.

22. The device in claim 21 wherein said first stripper further comprises a weight member, a first surface of said weight member being substantially adjacent a second surface of said disk, said second surface of said disk being opposite said first surface of said disk.

23. The device in claim 22 wherein a second surface of said weight member is substantially adjacent said first surface of said second stripper.

24. The device in claim 22 wherein a coil insertion star is mounted to said second stripper on said first surface thereof, and a second surface of said weight member is substantially adjacent a first surface of said coil insertion star.

25. The device in claim 24 wherein said coil insertion star has four legs.

26. The device in claim 24 wherein said coil insertion star has six legs.

27. The device in claim 18 wherein said second stripper has an axial length and each of said fins extends substantially the entire axial length of said second stripper.

28. The tool pack in claim 18 wherein said second stripper has an axial length and each of said fins has an axial length substantially less than the axial length of said second stripper.

* * * * *